Patented Jan. 27, 1931

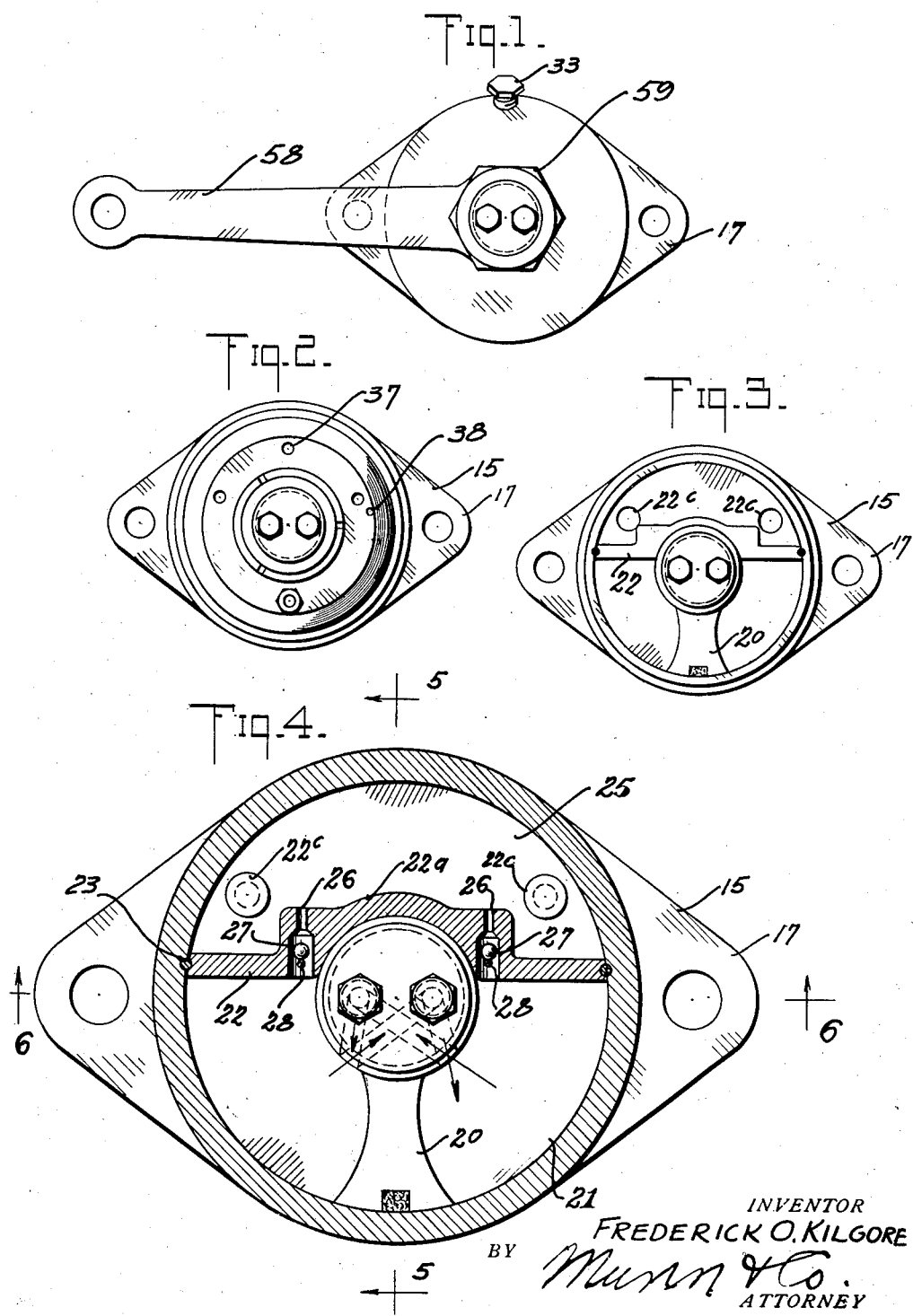

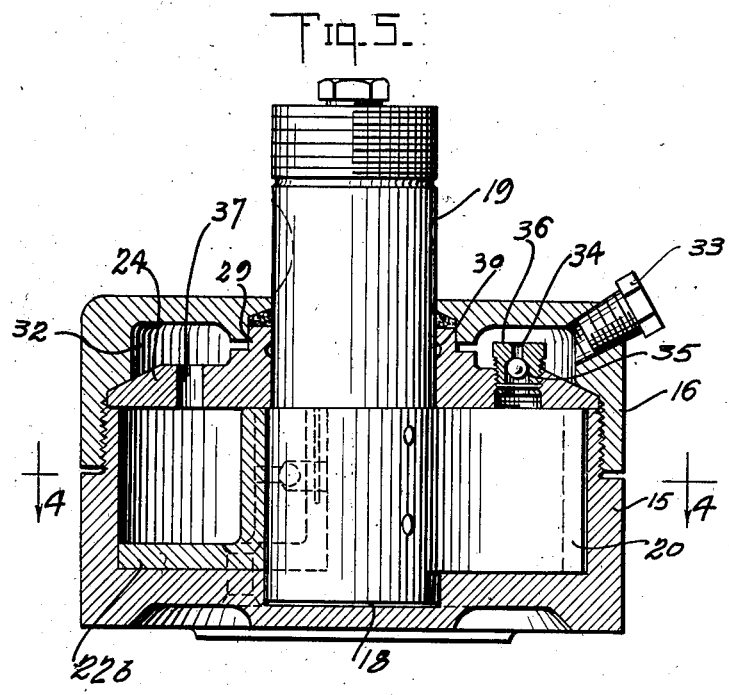
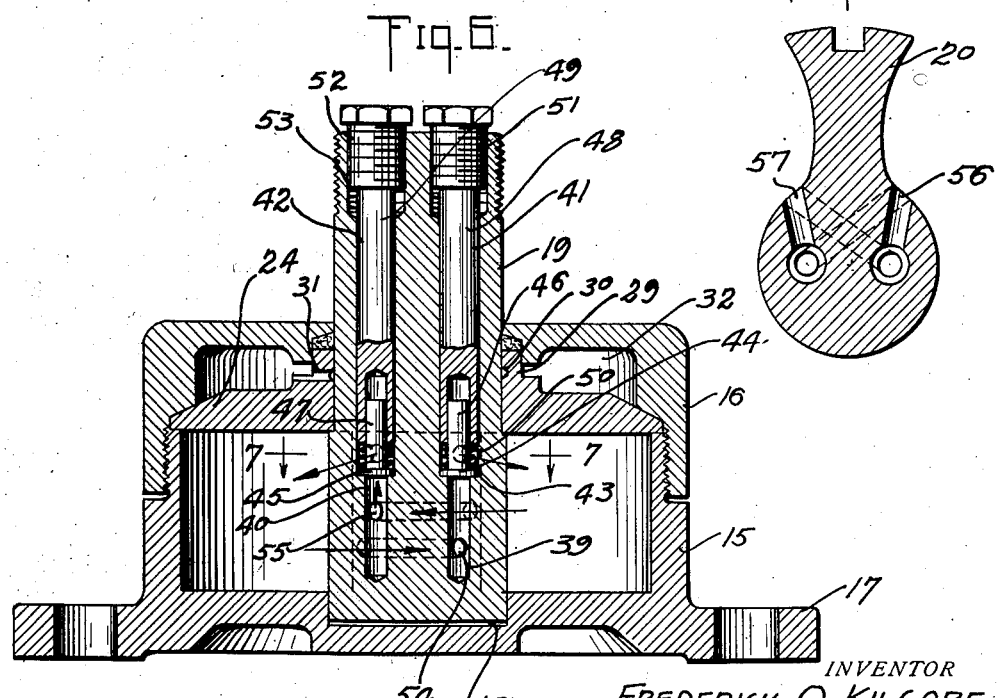

1,790,310

UNITED STATES PATENT OFFICE

FREDERICK O. KILGORE, OF FULLERTON, CALIFORNIA

SHOCK ABSORBER

Application filed August 15, 1927. Serial No. 213,083.

My invention relates generally to hydraulic shock absorbers, and particularly, although not necessarily, to such devices for use on automobiles.

A purpose of my invention is the provision of a hydraulic shock absorber characterized by its simplicity and compactness of construction, and embodying an oscillating abutment operating in a liquid medium to yieldingly resist any change in original relative position of two members movable relative to each other, and further embodying means by which the resistance offered by the liquid to the movement of the abutment in either direction can be varied at will, whereby relative movement of the members in either direction can be independently controlled.

I will describe only one form of shock absorber embodying my invention and will then point out the novel features thereof in claims.

In the accompanying drawings:

Fig. 1 is a view showing in side elevation one form of shock absorber embodying my invention.

Fig. 2 is a view showing the shock absorber in side elevation with the cover removed.

Fig. 3 is a view similar to Fig. 2 with the disk partition removed.

Fig. 4 is a horizontal sectional view taken on the line 4—4 of Fig. 5.

Figs. 5 and 6 are sectional views taken on the lines 5—5 and 6—6, respectively, of Fig. 4.

Fig. 7 is a sectional view taken on the line 7—7 of Fig. 6.

Similar reference characters refer to similar parts in each of the several views.

Referring specifically to the drawings, my invention, in its present embodiment comprises a housing made up of a base section 15 and a cover section 16 threaded on the base section, as illustrated in Fig. 6, to permit the removal of the cover section when required. The base section 15 is provided with ears 17 through which bolts may be extended for securing the housing as a unit to the frame of an automobile, and so that the axis of the housing will be disposed horizontally. A recess 18 (Figs. 5 and 6) is formed in the inner side of the bottom of the section 15 for rotatively receiving and thus centrally positioning the inner end of a shaft 19. The shaft is of such length as to extend exteriorly of the cover section 16 and through a suitable opening formed therein. A traveling abutment 20 is fixed to, or formed integral with, the shaft 19 so as to project radially therefrom for oscillation within a fluid chamber 21 provided interiorly of the base section through the coaction of a partition 22 secured in the position shown in Fig. 4, by means of pins 23 in coacting grooves at the ends of the partition, and a removable partition 24 of disk form, the latter serving as a closure for the base section 15. As an additional means for securing the partition in fixed position, it is provided with an angularly disposed base 22b which, as shown in Figs. 4 and 5, is secured to the base section by means of rivets 22c. The positioning of the partition 22 is such as to provide a liquid reservoir chamber 25 within the base section 15 in addition to the fluid chamber 21. In this chamber 25 an auxiliary supply of oil, or other suitable liquid, is contained to automatically replenish the chamber 21 with liquid when required. To permit liquid to pass from the chamber 25 into the chamber 21 ports 26 are provided in the partition 22 controlled by ball valves 27, in such manner that liquid cannot return to the chamber 25 after having passed into the chamber 21. Stop pins 28 are provided to allow the valves 27 to unseat and thus open the ports 26 when liquid is passing from the chamber 25 into the chamber 21. It will, of course, be understood that the pins 28 further serve to prevent displacement of the valves from the ports.

As shown in Fig. 4, the partition 22 is provided with an intermediate curved portion 22a to accommodate the shaft 19, and in such manner as to permit free rotation of the shaft within the housing. The disk 24 is provided centrally with an opening through which the shaft 19 extends, and this opening is surrounded by a collar 29 formed interiorly with an annular groove 30 communicating with a plurality of radial ducts 31 through which latter oil from the housing is adapted to pass into the groove 29 for lubrication of the shaft where it extends through the collar. The marginal edge of the disk 24 is beveled on its upper side, and the cover section 16 is correspondingly shaped in order that the edge of the disk can be firmly clamped between the sections 15 and 16, as clearly illustrated in Fig. 6. In this position of the disk, its inner portion is spaced from the top of the cover section 16 to provide an intervening chamber 32 to which oil may be supplied by the removal of a plug 33 threaded in the cover section 16, as shown in Fig. 5. Oil from the chamber 32 is free to enter the fluid chamber 21 through a port 34 controlled by a ball valve 35, the port and valve being embodied in a screw plug 36 threaded in the disk 24. The valve 35 will not permit oil to pass from the chamber 21 into the chamber 32, as will be understood. Oil from the chamber 32 is free to pass into the chamber 25 through ports 37 in the disk 24, and in order that the ports 34 and 37 may register with the respective chambers 21 and 25, the disk 24 may be properly positioned through the provision of a pin 38 extending upwardly from the partition 22 for engagement within a suitable opening in the disk 24.

The shaft 19 is bored longitudinally to form a pair of ducts 39 and 40 (Fig. 6), which communicate at their upper ends with bores 41 and 42, respectively, of an increased diameter to form seats 43 at the junction of the two upon which valves 44 and 45 normally seat. These valves are provided with stems 46 and 47, respectively, which are telescopically associated with the inner ends of rods 48 and 49, respectively. Springs 50 are interposed between the valves and rods, as shown in Fig. 6, to provide an operative connection between the two and to vary the pressure of liquid required to open the valves by an adjustment of the rods within the shaft. The rods may be adjusted manually by the provision of screws 51 and 52, respectively, on the upper ends of the rods 48 and 49. These screws are threaded in pockets 53 in the shaft 19, whereby rotation of the screws in one direction or the other will move the rods longitudinally to increase or decrease the tension of the springs 50.

At a point below the valves 44 and 45 the ducts 39 and 40 communicate with lateral ducts 54 and 55, respectively, the outer ends of which are disposed at opposite sides of the abutment 20. When the valves 44 and 45 are opened the ducts 39 and 40 are in communication with other radial ducts 56 and 57, respectively, (Fig. 7), and the outer ends of these ducts are likewise disposed at opposite sides of the abutment 20. The inner ends of these ducts communicate with the bores 41 and 42 and at points below the inner ends of the rods 48 and 49.

In practice the housing is secured to the frame of the automobile, while the shaft 19 is operatively connected to the automobile axle through the medium of an arm 58 (Fig. 1). The arm may be keyed to the shaft and secured against accidental displacement by a nut 59 threaded on the outer end of the shaft.

In operation, the chambers 32, 25 and 21 are filled with oil, or any other fluid suitable for the purpose. With the shock absorber applied to a vehicle, as described, any change in relative position of the vehicle frame and axle rotates the shaft in one direction or the other to cause oscillation of the abutment 20 within the chamber 21. With the abutment in the position shown in Fig. 4, movement thereof to the right places the oil in advance of the abutment under pressure, and when this liquid pressure reaches a degree predetermined by an adjustment of the rod 49, the valve 45 opens thus allowing the liquid to pass from the leading side of the abutment through the ducts 55, 40 and 57 into the chamber at the trailing side of the abutment. In this manner the resistance offered by the liquid is yielding to permit continued retarded movement of the abutment, resulting in a retarded rotation of the shaft 19. When the abutment moves in the opposite direction the liquid in advance thereof is by-passed to the trailing side of the abutment through the ducts 54, 39 and 56, the valve 45 moving to open position to place the ducts 39 and 56 in communication with each other. Thus according as the abutment is moved in one direction or the other the liquid in advance thereof will be by-passed from one side of the abutment to the other, and in such manner as to yieldingly resist the movement of the abutment. It will, of course, be understood that such retarding movement of the abutment is transmitted to the arm 58 through the shaft 19 to control relative movements of the vehicle frame and axle in a manner to eliminate shock being transmitted to the frame. Relative movement of the two members in either direction can be controlled independently through an adjustment of the valves 44 and 45 to control movement of the abutment by passing of the liquid in either direction and hence the resistance offered to the movement of the abutment. This independent control of the movement of the abutment constitutes an important feature of my invention, as in practice this function may be utilized to permit limited free play of the vehicle springs in downward movement of the vehicle frame by exercising the desired restraining power on the upward movement of the vehicle frame so as to prevent the transmission of shock to the vehicle body. Further, an adjustment of the valves 44 and 45 permits the shock absorber to be adjusted at the time of installation for a given load, and thereby rendering the device adaptable to vehicles widely varying in load.

Continued operation of the shock absorber requires replenishing of the chamber 21 with oil in order that proper resistance may be offered to the oscillation of the abutment. Through the provision of the chambers 25 and 32, which as previously described are filled with oil, the chamber 21 is automatically replenished with oil under the induced suction created by oscillation of the abutment which is sufficient to open the valves 27 and 34 to permit oil from the chambers 25 and 32 to be drawn into and thus refill the chamber.

In actual practice, the shock absorber in applied position is as shown in Fig. 4 so that the valves 27 are open to permit oil from the chamber 25 to gravitate into the working chamber 21 and thereby maintain the latter filled at all times to prevent the formation therein of air pockets which latter is formed would produce an objectionable noise as the abutment oscillates.

The rods 48 and 49 are constructed of a material possessing a relatively high co-efficient of expansion in order that they may be responsive to temperature changes to expand longitudinally and thus automatically increase the tension of the springs 50 in accordance with an increase in temperature for the purpose of increasing the pressure of liquid required to open the valves, and thereby offering a greater resistance to oscillation of the abutment to compensate for thinning of the oil as a result of the increased temperature. Conversely, the rods contract in response to a reduction in atmospheric temperature to lessen the resistance offered by the springs 50 to the opening movement of the valves 44 and 45, whereby the by-passing of oil from one side of the abutment to the other will occur with greater freedom to compensate for the increase in consistency of the oil resultant of the reduction in atmospheric temperature. Thus the thermo adjustment of the by-passing valves automatically compensates for any change in the consistency of the oil, so that the resistance offered by the oil to the movement of the abutment remains constant irrespective of temperature changes.

Although I have herein shown and described only one form of shock absorber embodying my invention, it is to be understood that various changes and modifications may be made herein without departing from the spirit of my invention and the spirit and scope of the appended claims.

What I claim is:

1. A shock absorber comprising a housing adapted to contain a fluid and having a working chamber therein, an abutment adapted to be oscillated in the working chamber, a shaft extending exteriorly of the housing to which the abutment is fixed, a pair of non-communicating ducts in the shaft by which fluid at one side of the abutment can be by-passed to the other side under oscillation of the abutment, valves one for each of and controlling the circulation of fluid through the ducts, and members manually adjustable in the shaft for regulating opening movement of the valves.

2. A shock absorber as embodied in claim 1 wherein said members are formed of a material responsive to temperature changes so as to increase or decrease the opening movement of the valves according as the temperature decreases or increases.

3. A shock absorber comprising a housing adapted to contain a fluid and having a working chamber therein, an abutment adapted to be oscillated in the working chamber, a shaft extending exteriorly of the housing to which the abutment is fixed, ducts in the shaft by which fluid at one side of the abutment can be by-passed to the other side under oscillation of the abutment, valves controlling the circulation of fluid through the ducts, springs yieldably closing the valves, and members threaded in the shaft and having a telescopic connection with the valves and engaging the springs to increase or decrease the tension of the springs.

4. A shock absorber as embodied in claim 3 wherein the members are formed of a material responsive to temperature changes so as to increase or decrease the opening movement of the valves according as the temperature decreases or increases.

5. A shock absorber comprising a housing having a body section, a partition in the body section dividing the latter into a working chamber and a fluid reservoir chamber, a second partition for closing the chambers, a cover on the body section securing the second partition in position and to provide a second fluid reservoir chamber in the housing, a shaft journaled in the housing and projecting exteriorly of the latter, an abutment fixed to the shaft to oscillate in the working chamber, ducts in the shaft by which fluid at one side of the abutment can be by-passed to the other side under oscillation of the abutment, valves controlling the circulation of fluid through the ducts, members adjustable in the shaft for regulating opening movement of the valves, and valved ports in the partitions for delivering fluid to the working chamber from the reservoir chambers to maintain the working chamber filled with fluid.

6. A shock absorber as embodied in claim 5 wherein said members are formed of a material responsive to temperature changes so as to increase or decrease the opening movement of the valves according as the temperature decreases or increases.

7. A shock absorber comprising a housing adapted to contain a fluid, an abutment capable of oscillation in the housing, a pair of ducts through which the fluid is by-passed from one side of the abutment to the other as the latter is oscillated, and valves one for each of the ducts and controlling the circulation of fluid so as to restrict the flow and thereby cause the fluid to yieldingly resist movement of the abutment, the valves being adjustable to vary the resistance offered by the fluid, and means for adjusting the valves independently of each other.

8. A shock absorber comprising a housing adapted to contain a fluid, an abutment capable of oscillation in the housing, a pair of ducts through which the fluid is by-passed from one side of the abutment to the other as the latter is oscillated, and valves one for each of the ducts and controlling the circulation of fluid so as to restrict the flow and thereby cause the fluid to yieldingly resist movement of the abutment, the valves being manually adjustable independently of each other and automatically adjustable independently of each other in response to temperature changes to control the circulation of fluid and thereby vary the resistance offered by the fluid.

9. A shock absorber comprising means defining a chamber adapted to contain a fluid, an abutment mounted for movement in the chamber, a pair of by-pass ducts, each of which communicates with the chamber at opposite sides of the abutment, and check valves one for each of and controlling and restricting the circulation of fluid through the ducts, and operable by fluid pressure to open one duct and close the other or vice versa according as the abutment moves in one direction or the other, whereby movement of the abutment will be resisted in both directions, said valves being adjustable to vary the restricting action thereof to the flow of fluid through the ducts, and means for adjusting the valves independently of each other.

10. A shock absorber comprising means defining a chamber adapted to contain a fluid, an abutment mounted for movement in the chamber, a pair of by-pass ducts, each of which communicates with the chamber at opposite sides of the abutment, and check valves one for each of and controlling and restricting the circulation of fluid through the ducts, and operable by fluid pressure to open one duct and close the other or vice versa according as the abutment moves in one direction or the other, whereby movement of the abutment will be resisted in both directions, said valves being automatically adjustable in response to temperature changes to vary the restricting action thereof to the flow of fluid through the ducts.

11. A shock absorber comprising means defining a chamber adapted to contain a fluid, an abutment adapted to be mounted for movement in the chamber, a shaft to which the abutment is fixed, a pair of by-pass ducts in the shaft, each of which communicates with the chamber at opposite sides of the abutment, and check valves one for each of and controlling the circulation of fluid through the ducts and operable by fluid pressure to open one duct and close the other or vice versa according as the abutment moves in one direction or the other, whereby movement of the abutment will be resisted in both directions.

12. A shock absorber comprising means defining a chamber adapted to contain a fluid, an abutment adapted to be mounted for movement in the chamber, a shaft to which the abutment is fixed, a pair of by-pass ducts in the shaft, each of which communicates with the chamber at opposite sides of the abutment, and check valves one for each of and controlling the circulation of fluid through the ducts, normally urged to close the ducts and operable by fluid pressure to open one duct and close the other or vice versa according as the abutment moves in one direction or the other, whereby movement of the abutment will be resisted in both directions.

13. A shock absorber comprising means defining a chamber adapted to contain a fluid, an abutment adapted to be mounted for movement in the chamber, a shaft to which the abutment is fixed, a pair of by-pass ducts in the shaft, each of which communicates with the chamber at opposite sides of the abutment, and check valves one for each of and controlling and restricting the circulation of fluid through the ducts, normally urged to close the ducts and operable by fluid pressure to open one duct and close the other or vice versa according as the abutment moves in one direction or the other, whereby movement of the abutment will be resisted in both directions, said valves being adjustable in response to temperature changes to vary the restricting action thereof to the flow of fluid through the ducts.

14. A shock absorber comprising means defining a chamber adapted to contain a fluid, an abutment adapted to be mounted for movement in the chamber, a shaft to which the abutment is fixed, a pair of by-pass ducts in the shaft, each of which communicates with the chamber at opposite sides of the abutment, check valves one for each of and controlling and restricting the circulation of fluid through the ducts and operable by fluid pressure to open one duct and close the other or vice versa according as the abutment moves in one direction or the other, whereby movement of the abutment will be resisted in both directions, and thermo-responsive means for adjusting the valves to vary the restricting action thereof to the flow of fluid through the ducts.

FREDERICK O. KILGORE.